United States Patent [19]

Miyazaki

[11] Patent Number: 4,718,512
[45] Date of Patent: Jan. 12, 1988

[54] INSTRUMENT PANEL
[75] Inventor: Takumi Miyazaki, Yokohama, Japan
[73] Assignee: Nissan Motor Co., Ltd., Japan
[21] Appl. No.: 304,897
[22] Filed: Sep. 23, 1981
[30] Foreign Application Priority Data
 Sep. 29, 1980 [JP] Japan .................... 55-134223
[51] Int. Cl.⁴ ........................................ B60K 37/00
[52] U.S. Cl. ................................ 180/90; 248/74.3
[58] Field of Search ............ 180/90; 248/74 A, 74 B, 248/74 R, 313, 311.2; 174/72 A; 361/428; 307/10 R

[56] References Cited
U.S. PATENT DOCUMENTS

| | | | |
|---|---|---|---|
| 3,022,447 | 2/1962 | Henss | 180/90 |
| 3,270,831 | 9/1966 | Woofter | 180/90 |
| 3,409,971 | 11/1968 | Morrow | 248/74 B |
| 3,508,730 | 4/1970 | Knezo | 248/74 A |
| 3,550,219 | 12/1970 | Van Buren | 248/73 |
| 3,630,564 | 12/1971 | Ferrara | 174/72 A |
| 3,861,015 | 1/1975 | Hooven | 248/74 A |
| 4,227,239 | 10/1980 | Boyer | 180/90 |
| 4,272,047 | 6/1981 | Botka | 248/74 PB |
| 4,334,659 | 6/1982 | Yuda | 248/74 A |
| 4,356,987 | 4/1982 | Schmid | 248/74 A |

Primary Examiner—John J. Love

[57] ABSTRACT

An instrument panel with a flexible harness arranged at a location adjacent and in opposition to a vehicle body or equipment comprises a clip panel secured to the instrument panel by means of hinges to cover the flexible harness for fixing it to the instrument panel, whereby the clip panel serves to fix the harness to the instrument panel and simultaneously to guard the harness, thereby eliminating a clip for a fixation of the harness and a high expensive protector for guarding the harness.

1 Claim, 8 Drawing Figures

INSTRUMENT PANEL

BACKGROUND OF THE INVENTION

1. Field of the Invention

This invention relates to an instrument panel for guarding harnesses from being damaged by a vehicle body or equipment and fixing the harnesses against movements thereof.

2. Description of the Prior Art

A prior art instrument panel will be explained by referring to FIGS. 1-3. A flexible harness 2 is arranged along the instrument panel 1 which is in opposition to a part of a vehicle body 6 such as a cowl box or pedal bracket or an equipment (not shown) having a slide member such as a heater control unit. As shown in, for example, FIGS. 1-3, the flexible harness 2 is covered with a protector 3 consisting of a resin tape or the like wound thereabout to prevent the harness from being in direct contact with the vehicle body 6, particularly a flange 6b of a pedal bracket 6a in the proximity of the harness 2. The harness 2 is fixedly fitted in a clip 4 threadedly inserted in a female member 1a extending from the instrument panel 1.

The clip 4 is shown as a construction embracing the harness 2. Other types of the clip 4 are used, which comprises a belt 7a embracing the harness 2 as shown in FIG. 4 or a steel plate 8a adapted to be wound about the harness 2 as shown in FIG. 5 illustrated at 8. In brief, the clip 4 is formed separately from the instrument panel 1. Instead of the above protector 3, a protector 9 is also used which is in the form of a bellows tube of polyvinyl chroride as shown in FIG. 6. A numeral 5 illustrates an indicator casing accommodating an indicator 5a.

With this arrangement, however, there are the following shortcomings. First, it absolutely requires a part such as a clip 4, 7 or 8 only for the purpose of fixing the harness 2.

Second, the protector 3 is very expensive, which is unavoidably required, when the vehicle body is vibrated, to prevent the harness 2 from being in contact with and damaged by the part of the vehicle body such as the pedal bracket, heater control lever or the like or equipment adjacent to the harness 2 only assembled thereat and fixed by the clip 4, 7 or 8.

Third, the mounting of the harness 2 is complicated because two parts are necessary for the purpose, one is the clip 4, 7 or 8 as fixing means for the harness and the other is the protector 3 or 9 as guard means for the harness.

SUMMARY OF THE INVENTION

It is a primary object of the invention to provide an improved instrument panel which eliminates all of the above disadvantages of the prior art.

It is a special object of the invention to provide an instrument panel for a vehicle, which is provided with a clip panel pivotally secured to the instrument panel through hinges at a location in opposition to a vehicle body or equipment so as to cover a harness located adjacent to the vehicle body or equipment for fixing the harness to the instrument panel.

Other and further objects, features and advantages of the invention will appear more fully from the following description by referring to the attached drawings.

DETAILED DESCRIPTION OF THE PREFERRED EMBODIMENT

Figure 1:
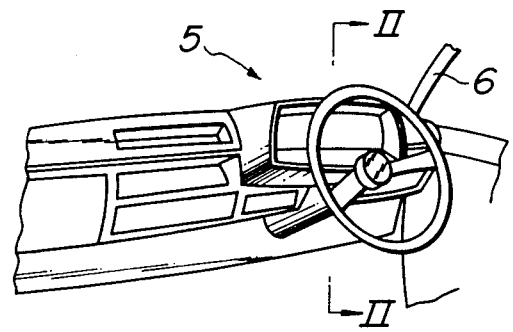
FIG. 1 is a perspective view of an instrument panel of the prior art as viewed from a passenger compartment as mentioned above.
Figure 2:
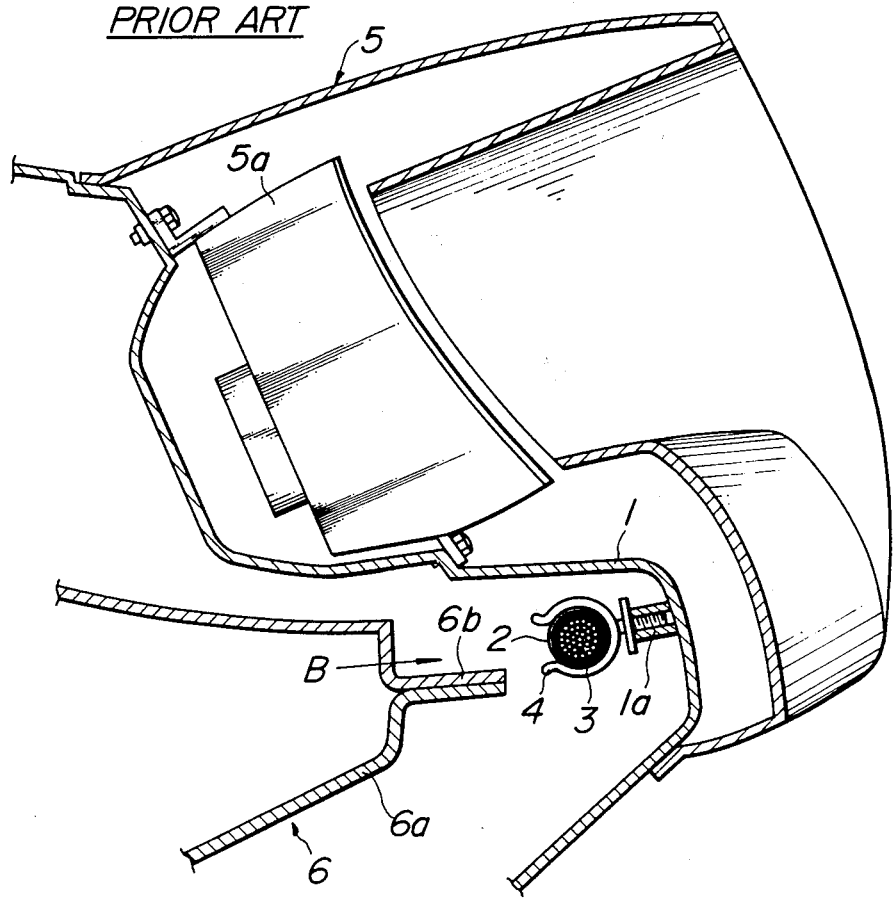
FIG. 2 is an enlarged sectional view of the instrument panel taken along line II—II in FIG. 1.
Figure 3:
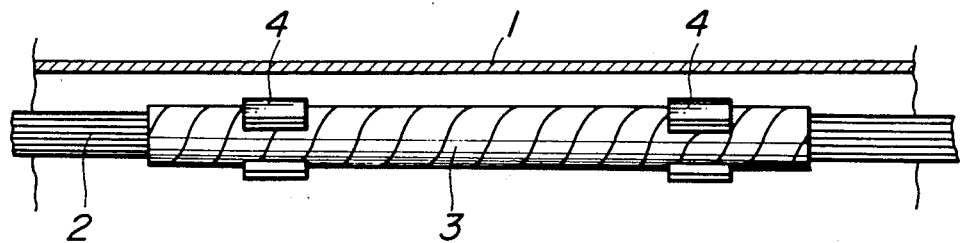
FIG. 3 is a front elevation of the harness as viewed in a direction of an arrow B in FIG. 2.
Figure 4:
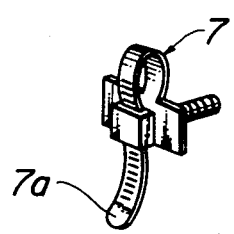
FIG. 4 is a perspective view of a clip of the prior art for fixing a harness as mentioned above.
Figure 5:
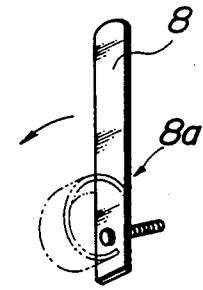
FIG. 5 is a perspective view of another clip of the prior art as mentioned above.
Figure 6:
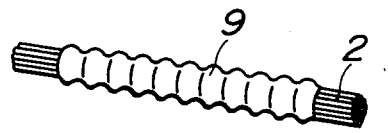
FIG. 6 is perspective view of a protector of the prior art for guarding a harness as mentioned above.
Figure 7:
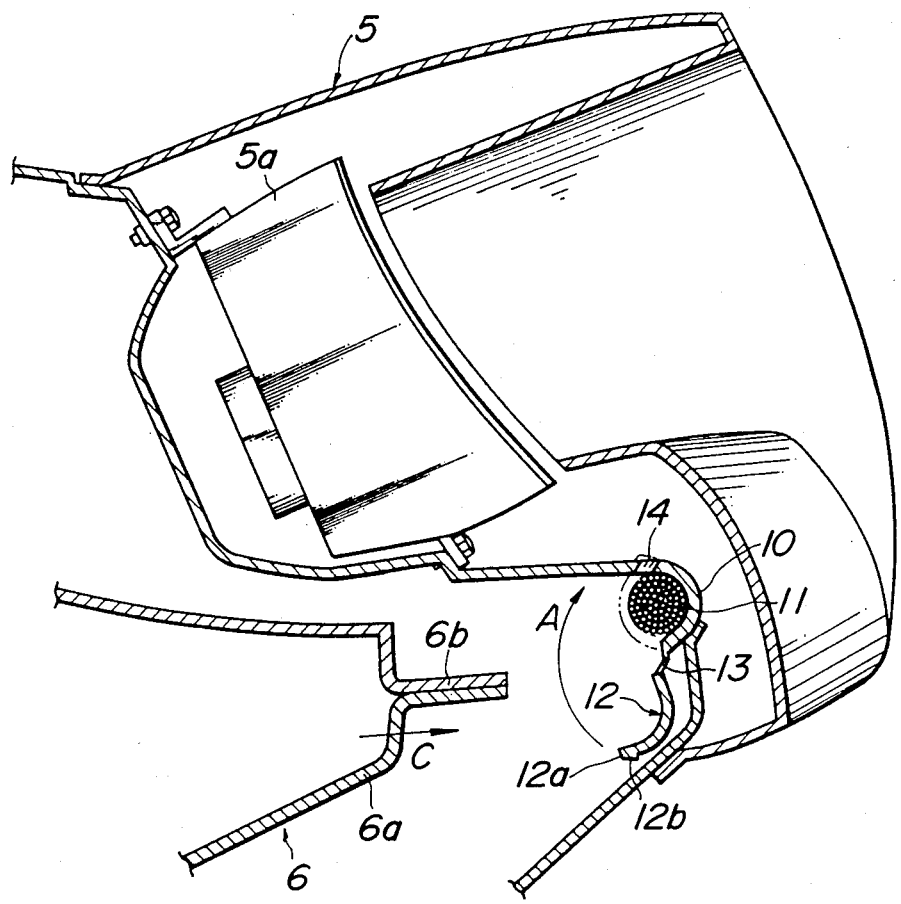
FIG. 7 is a sectional view illustrating an instrument panel according to the invention.
Figure 8:
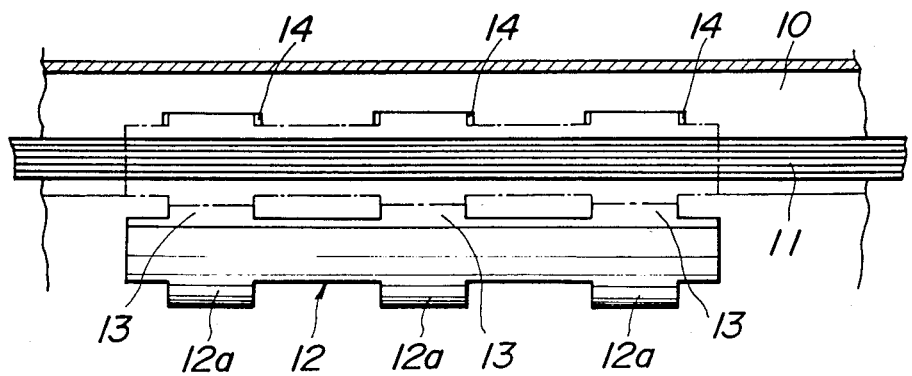
FIG. 8 is a front elevation of the instrument panel as viewed in a direction of an arrow C in FIG. 7.

FIGS. 7 and 8 illustrate a preferred embodiment of the invention, wherein like parts have been designated by the same reference numerals as those in FIGS. 1-3 and will not be described in further detail. At a part of an instrument panel body 10 adjacent and in opposition to a vehicle body 6 or equipment (not shown), a harness 11 is arranged. A clip panel 12 is made of a panel which is long in a lengthwise direction of the harness and short in a direction perpendicular to the lengthwise direction of the harness. The clip panel 12 is curved along its longitudinal axis and has on its longitudinal side a series of thin hinges 13 arranged side by side in the lengthwise direction of the harness 11 and secured to the instrument panel body. The clip panel 12 further has on the other longitudinal side latches 12a having hooks 12b at a constant interval along the side. The instrument panel body 10 is formed with latch apertures 14 receiving the latches 12a to engage their hooks 12b such that the clip panel 12 is anchored to the instrument panel body 10. Instead of the hinges 13, pin hinges may be used.

With this arrangement, when a harness 11 is mounted and fixed to the panel body 10, at first the clip panel 12 is opened into a position shown in solid lines in FIGS. 7 and 8 and the harness 11 is arranged along the hinges 13 of the instrument panel body 10. Then, the clip panel 12 is pivotally moved in a direction of an arrow A (FIG. 7) so as to cover the harness 11 and simultaneously to force the latches 12a into the latch apertures 14 of the instrument panel body 10, whereby the clip panel 12 deforms inwardly and its hooks 12b engage the latch apertures 14 shown in dot-and-dash lines in the drawings so that the harness 11 is securely fixed to the instrument panel body 10.

Once the harness 11 has been thus fixed to the instrument panel body, even if the pedal bracket 6a is moved back and forth, right and left and up and down or equipment (not shown) such as a heater control lever is moved, this moving part does not contact the harness but contacts only the clip panel 12 covering the harness over a wide range. Therefore, the harness 11 is completely guarded from such a moving part to eliminate the risk of damage of the harness 11 by the vehicle body part 6 and equipment (not shown).

As can be seen from the description, according to the invention an instrument panel body adjacent to and in opposition to a vehicle body or equipment and equipped with a harness is provided with a clip panel secured thereto by means of hinges for fixing a harness to the instrument panel body, so that the clip panel serves to fix the harness to the panel body and simultaneously to guard it. Accordingly, a clip exclusively for fixing a harness as in the prior art is not required and further an expensive protector for guarding the harness is not needed. It is very advantageous for reducing cost. According to the invention the clip panel performs the fixation and guard of the harness to eliminate two parts, clip and protector required in the prior art, so that the mounting operation of the harness is simplified to contribute a rationalization of its manufacturing process.

It is further understood by those skilled in the art that the foregoing description is a preferred embodiment of this disclosed panel and that various changes and modifications may be made in the invention without departing from the spirit and scope thereof.

What is claimed is:

1. An instrument panel with a flexible harness arranged adjacent thereto at a location in opposition to a vehicle body and the like, said instrument panel comprising a clip panel covering said harness in its operative position, said clip panel made of a panel which is long in a lengthwise direction of the harness and short in a direction perpendicular to said lengthwise direction and is arcuately curved along its longitudinal axis to conform to the outer configuration of said harness, said clip panel having on one longitudinal side thereof a series of thin hinges arranged side by side in the lengthwise direction and permanently secured to the instrument panel for enabling said clip panel to move to an operative position for engagement with said harness, said clip panel having on another longitudinal side latches having catch means disposed along said another side for holding the clip panel in an operative position, said instrument panel further being formed with latch apertures adapted to receive said latches to engage said catch means.

* * * * *